(12) United States Patent
Durantay et al.

(10) Patent No.: US 12,074,482 B2
(45) Date of Patent: Aug. 27, 2024

(54) ELECTRICAL MACHINES AND METHODS TO MITIGATE BEARING CURRENTS

(71) Applicant: General Electric Renovables Espana, S.L., Barcelona (ES)

(72) Inventors: Lionel Durantay, Champigneulles (FR); Kum Kang Huh, Niskayuna, NY (US); Christophe Grosselin, Champigneulles (FR); Henri Baerd, Champagne sur Seine (FR); Ludger Luetkehues, Salzbergen (DE); Giesbert Krueger, Salzbergen (DE)

(73) Assignee: General Electric Renovables Espana, S.L., Barcelona (ES)

( * ) Notice: Subject to any disclaimer, the term of this patent is extended or adjusted under 35 U.S.C. 154(b) by 56 days.

(21) Appl. No.: 18/093,524

(22) Filed: Jan. 5, 2023

(65) Prior Publication Data

US 2023/0223826 A1  Jul. 13, 2023

(30) Foreign Application Priority Data

Jan. 8, 2022  (EP) ..................................... 22382007

(51) Int. Cl.
*H02K 11/40* (2016.01)
*H02K 5/173* (2006.01)
(Continued)

(52) U.S. Cl.
CPC ........... *H02K 11/40* (2016.01); *H02K 5/1732* (2013.01); *H02K 7/083* (2013.01); *H02K 7/1838* (2013.01);
(Continued)

(58) Field of Classification Search
CPC ...... H02K 11/40; H02K 5/1732; H02K 7/083; H02K 7/1838; H02K 11/0094;
(Continued)

(56) References Cited

U.S. PATENT DOCUMENTS

| | | | |
|---|---|---|---|
| 7,339,777 | B2 | 3/2008 | Barnard et al. |
| 7,830,031 | B2 | 11/2010 | Helle et al. |

(Continued)

FOREIGN PATENT DOCUMENTS

| | | |
|---|---|---|
| CN | 103607074 B | 3/2016 |
| CN | 211481055 U | 9/2020 |

(Continued)

OTHER PUBLICATIONS

European Search Report Corresponding to EP22382007 on Jul. 7, 2022.

(Continued)

*Primary Examiner* — Joseph Ortega
(74) *Attorney, Agent, or Firm* — Dority & Manning, P.A.

(57) ABSTRACT

The present disclosure relates to electrical machines (100, 200) configured to be fed by pulse width modulation from a power converter (170) and comprising a stator (110), a rotor (120), a rotor shaft (130) and one or more bearings (140, 141) arranged between the rotor (120) and the stator (110). The electrical machine (100, 200) further comprising an electrical shunt (160, 161) arranged between the rotor shaft (130) and the stator (110). The present disclosure also relates to methods (500) to mitigate electrical discharge machining bearing currents in electrical machines (100, 200).

15 Claims, 4 Drawing Sheets

(51) Int. Cl.
*H02K 7/08* (2006.01)
*H02K 7/18* (2006.01)
*F03D 9/25* (2016.01)
*F03D 80/70* (2016.01)

(52) U.S. Cl.
CPC ............... *F03D 9/25* (2016.05); *F03D 80/70* (2016.05); *F05B 2220/706* (2013.01); *F05B 2240/50* (2013.01); *F05B 2260/98* (2013.01)

(58) Field of Classification Search
CPC . H02K 13/00; F03D 9/25; F03D 80/70; F05B 2220/706; F05B 2240/50; F05B 2260/98; Y02E 10/72
See application file for complete search history.

(56) References Cited

U.S. PATENT DOCUMENTS

| | | | |
|---|---|---|---|
| 8,189,317 | B2 | 5/2012 | Oh et al. |
| 9,653,970 | B2 | 5/2017 | Reed et al. |
| 10,109,969 | B2 | 10/2018 | Faber et al. |
| 10,110,088 | B2 | 10/2018 | Walter et al. |
| 2008/0258576 | A1 | 10/2008 | Oh et al. |
| 2012/0319723 | A1 | 12/2012 | Hassel et al. |
| 2018/0080434 | A1* | 3/2018 | Carr .................. F03D 17/00 |
| 2019/0081538 | A1 | 3/2019 | Nye et al. |
| 2019/0296617 | A1 | 9/2019 | Hubert et al. |
| 2022/0006367 | A1 | 1/2022 | Roman et al. |

FOREIGN PATENT DOCUMENTS

| | | |
|---|---|---|
| CN | 212627559 U | 2/2021 |
| CN | 212784994 U | 3/2021 |
| DE | 102010002071 B4 | 8/2012 |
| DE | 102014225225 A1 | 6/2016 |
| EP | 2395633 A2 | 2/2011 |
| EP | 2669512 B1 | 9/2015 |
| EP | 2514078 B1 | 5/2019 |

OTHER PUBLICATIONS

Muetze, Bearing Currents in Inverter-Fed AC-Motors-Institut EW, Academic State of Art—2003 Thesis, 267 Pages.

Whittle et al., Bearing Currents in Wind Turbine Generators, Journal of Renewable and Sustainable Energy, vol. 5, No. 5, Sep. 2013, 15 Pages. https://www.researchgate.net/publication/274928490_Bearing_currents_in_wind_turbine_generators.

* cited by examiner

ELECTRICAL MACHINES AND METHODS TO MITIGATE BEARING CURRENTS

FIELD

The present disclosure relates to electrical machines and methods to mitigate electrical discharge machining bearing currents in the same. Electrical machines such as podded propulsion motors for marine applications and doubly-fed induction generators are also provided.

BACKGROUND

Electrical machines, including electrical motors and generators, are generally equipped with bearing assemblies between rotating parts. Bearing assemblies are an important mechanical component of such electrical machines, since its correct functioning allows a smooth operation and reduces mechanical losses associated with rolling friction between moving parts.

Bearing currents are ubiquitous in electrical machines, however the damage they cause has increased during the last decades. The design and manufacturing practices of modern electrical machines has nearly eliminated low frequency bearing currents. Modern variable speed machines may employ power converters with Pulse Width Modulation (PWM) feeding e.g. the rotor or stator of the electrical machine through slip rings, with fast rising pulses and high switching frequencies, which may induce high frequency (HF) currents.

When the voltage of these high frequency currents is sufficiently high to overcome the dielectric properties of the bearing grease, discharge across bearing components to adjacent electrical machine parts such as a housing can occur. The electrical discharge across bearing components may lead to a local temperature increase in the surface region where the discharge takes place. In fact, the temperature increase may be high enough to locally melt the surface and damage bearing components such as ball bearings, roller bearings and/or bearing races. Such a discharge may leave a small fusion crater (fret) in the bearing component. This type of current discharge may repeatedly take place across bearing assemblies, causing a gradual erosion of the bearing races and significantly reducing the overall efficiency of the electrical machine. This is known in the field as electrical discharge machining (EDM) bearing current.

Several approaches to eliminate or mitigate converter-induced bearing currents have been proposed in the past. These can be broadly divided into two groups. First, there are mitigation techniques that are applied on the power converter side. These techniques include converter output filters, sinusoidal filters, special voltage modulation techniques or special cables such as shielded cables. Adaptations or changes of the power converter or its PWM control can be complex and may have significant expenses associated. Secondly, there are countermeasures against bearing current discharges at the level of the electrical machine. This group of measures includes insulated or ceramic bearings, low impedance grease between bearing components, insulating the driven end coupling, grounding the rotor or electrostatically shielding the machine rotor.

However, the inventors have discovered that premature wear of bearings in electrical machines is still a problem even when all state of the art measures for avoiding bearing current discharges are applied.

The present disclosure provides examples of systems and methods that avoid or reduce premature wear of bearings in PWM controlled electrical machines. Examples of the methods and systems provided herein may be used in wind turbines. However, the current disclosure is not limited to this particular implementation.

SUMMARY

In a first aspect, an electrical machine is provided. The electrical machine is configured to be fed by pulse width modulation from a power converter. The electrical machine comprises a stator, a rotor, a load operatively connected to the rotor and one or more bearings arranged between the rotor and the stator. Further, the rotor comprises a rotor shaft with a grounding assembly. The one or more bearings comprise an inner ring, an outer ring and rolling elements and lubricant between the inner ring and the outer ring. Additionally, one of the inner ring and the outer ring is mounted to the rotor shaft, and the other of the inner ring and the outer ring is mounted to a corresponding bearing supporting stator portion. One or more bearing electrical insulations are arranged between the corresponding bearing supporting stator portions and a remainder of the stator. Furthermore, the one or more bearings comprise an electrical shunt with an impedance at high frequency that is lower than an impedance of the lubricant. The electrical shunt is arranged between the rotor shaft and a point of the stator at a bearing side of the corresponding bearing electrical insulation.

According to this first aspect, damage to bearings can be avoided or reduced. Inventors found that in spite of all recommended measures being taken to avoid currents through the bearings, fretting damage caused by EDM currents still appeared. Inventors found that voltage residues experienced by the lubricant at the contacts of the rolling elements of the bearing caused these discharges.

According to this aspect, the disclosed electrical machine mitigates EDM bearing currents using a simple and yet reliable arrangement. The electrical shunt achieves lowering the voltage difference between the outer and inner rings of the bearing and experienced by the lubricant. This is accomplished when the electrical shunt is electrically connected between the rotor shaft and a point of the stator at a bearing side of the corresponding bearing electrical insulation. Voltage above a breakdown voltage can thus be avoided or at least occur less frequently, and thereby discharges are reduced or avoided.

Further, according to this aspect, the power converter components do not require any modification and the associated costs are reduced. The simplicity of the approach also results in a considerable reduction in assembly time as compared with other known measures where wiring reconfiguration or component replacements may take place.

In another aspect, a method for mitigating EDM bearing currents in an electrical machine is provided. More specifically, the electrical machine is controlled by pulse width modulation from a power converter. The electrical machine comprises a stator, a rotor including a rotor shaft and a load operatively connected to the rotor. Further, the rotor shaft is rotatably mounted with respect to the stator through one or more bearings. The method comprises providing an electrical connection between the rotor shaft and a part of the stator at a bearing side of the bearing electrical insulation.

The method according to this aspect allows to reduce EDM bearing currents in either existing machines or new electrical machines. Particularly, EDM bearing currents can be avoided in electrical machines where no significant bearing currents were even expected. Further, it achieves this by a simple assembly configuration that can be easily maintained and replaced during electrical machine operation. This method results in a very cost-effective measure that may considerably increase the service life of bearing assemblies and therefore of electrical machines.

Throughout the present disclosure, reference is made to "high frequency" in relation with electrical properties of different elements. In the present disclosure, the term "high frequency" refers to frequencies in the order of magnitude of MHz. In particular, high frequency may mean a frequency of 0.5 MHz or higher, specifically 1 MHz or higher and more specifically 1-10 MHz.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
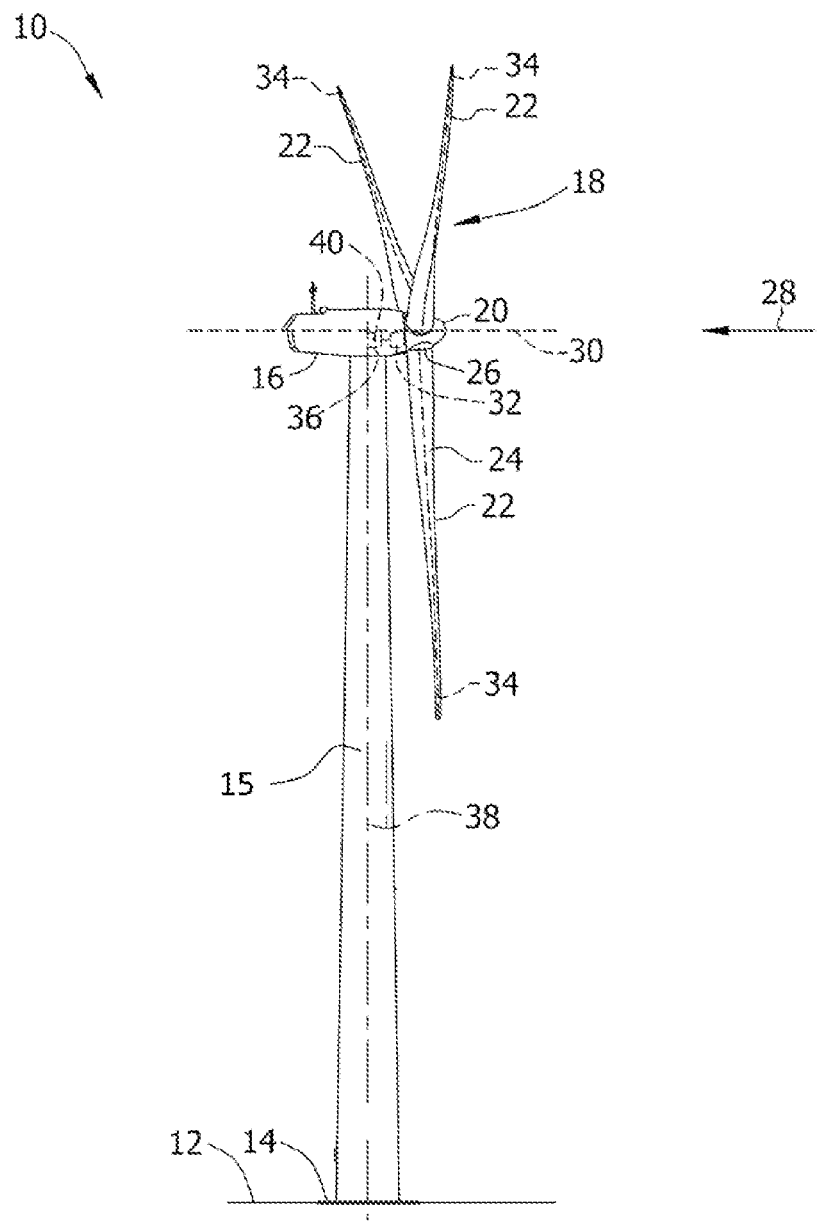
FIG. 1 illustrates a perspective view of a wind turbine according to one example.

Reference now will be made in detail to embodiments of the present disclosure, one or more examples of which are illustrated in the drawings. Each example is provided by way of explanation only, not as a limitation. In fact, it will be apparent to those skilled in the art that various modifications and variations can be made in the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

Figure 2:
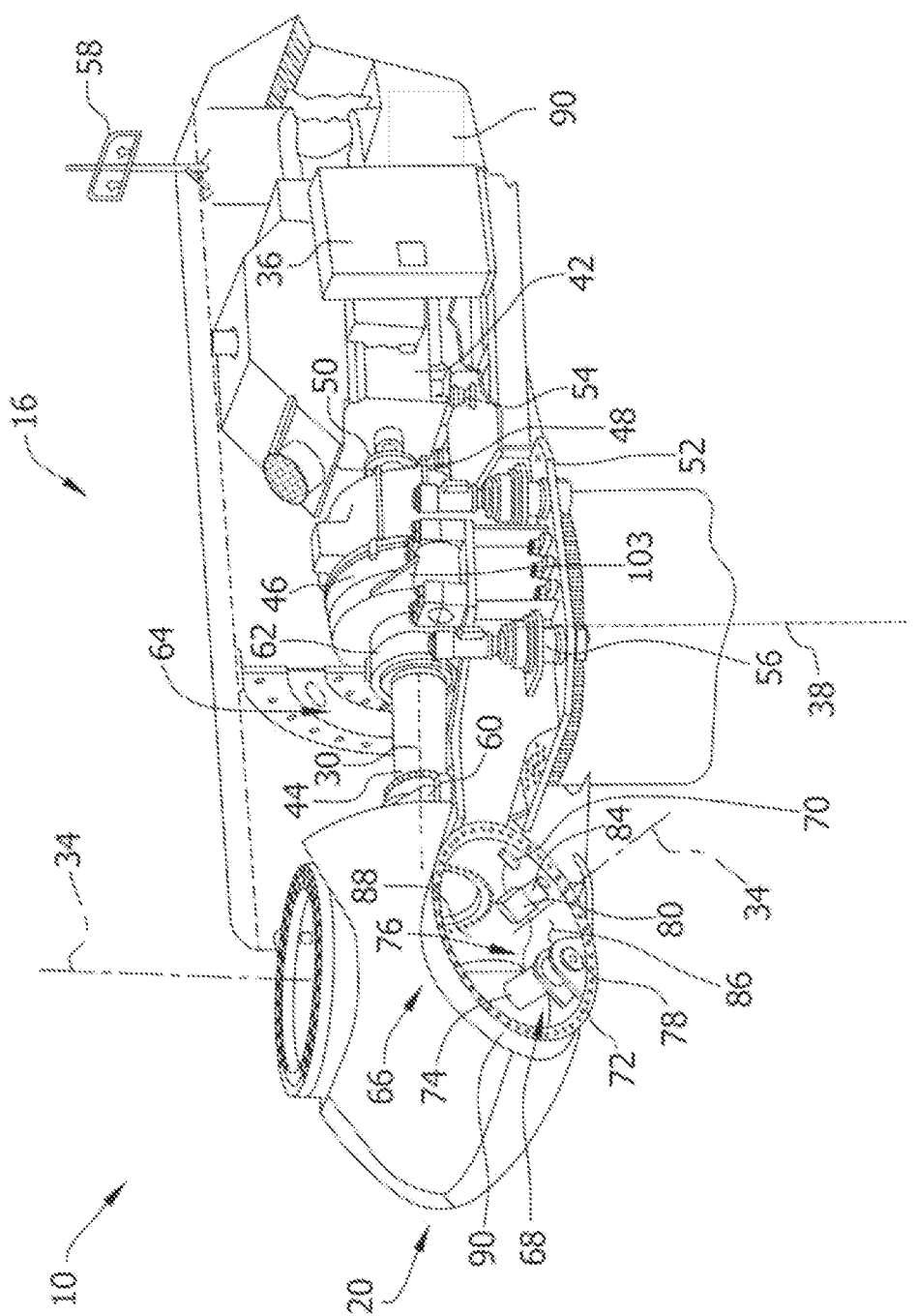
FIG. 2 illustrates a detailed, internal view of a nacelle of a wind turbine according to one example.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400 V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system 58 which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34.

Pitch drive system 68 is coupled to the wind turbine controller 36 for adjusting the pitch angle of a rotor blade 22 upon receipt of one or more signals from the wind turbine controller 36. The pitch assembly 66 may also include one or more pitch control systems 80 for controlling the pitch drive system 68 according to control signals from the wind turbine controller 36, in case of specific prioritized situations and/or during rotor 18 overspeed.

Figure 3:
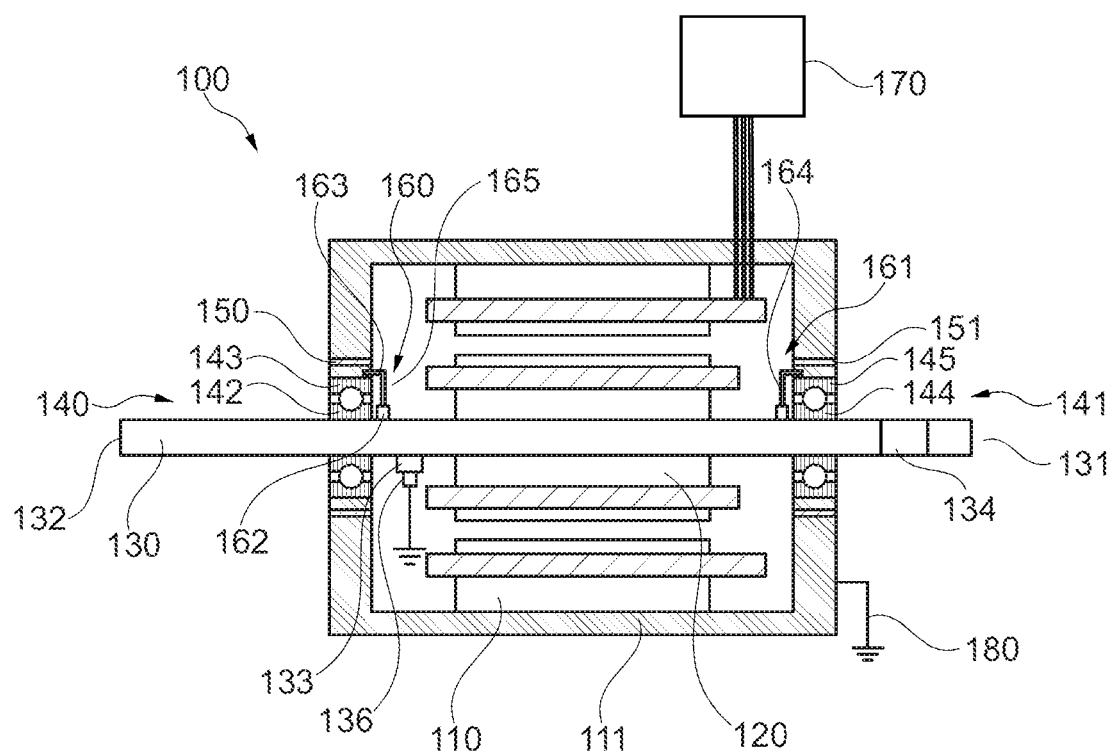
FIG. 3 schematically illustrates a cross-section view of a podded propulsion motor immerged in water according to another example.

FIG. 3 schematically illustrates a cross-section view of an electrical machine 100 configured to be fed by pulse width modulation from a power converter 170. The electrical machine 100 comprises a stator 110, a rotor 120, a load operatively connected to the rotor 120 and one or more bearings arranged between the rotor 120 and the stator 110. In this example, two bearings 140, 141 are arranged between the rotor 120 and stator 110.

The rotor 120 comprises a rotor shaft 130 with a grounding assembly 133. The bearing 140 comprises an inner ring 142, an outer ring 143, and rolling elements between the inner ring 142, and the outer ring 143. Similarly, the bearing 141 comprises an inner ring 144, an outer ring 145 and rolling elements between the inner ring 144 and the outer ring 145. Each of the bearings comprises a lubricant between the inner rings 142, 144 and outer rings 143, 145.

One of the inner ring and the outer ring is mounted to the rotor shaft 130 and the other one of the inner ring and the outer ring is mounted to a corresponding bearing supporting stator portion. In the present example, the inner rings 142, 144 are mounted to the rotor shaft 130, and the outer rings 143, 145 are mounted to a portion of the stator.

Further, one or more bearing electric insulations 150, 151 are arranged between the corresponding bearing supporting stator portion and a remainder of the stator 110. Each of the bearings 140, 141 may be electrically insulated from a remainder of the stator 110. As illustrated in the example, the bearing electric insulations 150, 151 may be located in a stator frame 111. Additionally, the stator frame 111 may have a connection to ground 180.

The electrical machine further comprises one or more electrical shunts between the rotor shaft and a point of the stator 110 at a bearing side of the corresponding bearing electrical insulation 150, 151. In this example, with two bearings 140, 141, two electrical shunts 160, 161 are provided, i.e. one for each bearing.

The electrical shunts 160, 161 have a low resistance, and a low inductance and thus a low impedance at high frequency. Particularly, the impedance of the electrical shunts 160, 161 is lower than an impedance of the lubricant of the bearings 140, 141. Therefore, high frequency currents, e.g. currents with a frequency in the order of a few MHz, induced by the power converter 170 may easily flow across the electrical shunt 160, 161. Thus, electrically communicating both sides (i.e. inner ring 142, 144 and outer ring 143, 145) of the bearings 140, 141 can reduce a voltage difference between one side of the bearing and another side of the bearing and significantly reduce EDM bearing currents.

In examples, the inventors have found that voltage difference across the bearings can be reduced at least in half for peak voltages and approximately ten times for root mean square voltages.

In some examples, the impedance of the electrical shunt 160, 161 may be an order of magnitude smaller than the impedance of the lubricant within the bearing. Specifically, the impedance of the electrical shunt 160, 161 may be e.g. 10, 15, 20 or 30 times smaller than the impedance of the lubricant for electrical signals of 1 MHz originated from the power converter 170 commutations. Although the electrical properties may vary for different lubricants, in some examples, the electrostatic capacitance of the lubricant may be around $10^{-8}$ F, whereas the inductance of the shunts 160, 161 may be e.g. around $10^{-7}$ H.

Further, FIG. 3 shows that the electrical shunt 160, 161 may comprise a brush 162. The brush 162 may be electrically coupled with the rotor shaft 130 of the electrical machine 100. The brush 162 can provide a nearly uniform contact surface during rotation of the rotor shaft 130. To provide a low resistive path from the rotor shaft 130 to a point of the stator 110 at a bearing side of the corresponding bearing electrical insulation 150, 151, the brush 162 may be a silver graphite brush or a carbon fiber brush. Besides, such brushes can withstand well erosion from rolling friction, providing a reliable electrical coupling between rotating parts. Furthermore, the shunt 160, 161 may comprise a conductive element 164, 165 providing electrical connection between the brush 162 and the stator 110.

In the example illustrated in FIG. 3, the bearings 140, 141 are metallic, but other materials such as ceramic or coated bearings can also be used depending on technical specifications of the electrical machine.

Although FIG. 3 shows a cylindrical rotor shaft 130 mechanically connected to the rotor 120 inside the stator 110, it should be understood that a rotor shaft 130 may have any suitable shape and dimension to translate the loads from the driven end 131 to the rotor 120, or vice versa. Thus, in other examples, the rotor shaft may be a hollow body mechanically connected to the rotor 110 and exterior to the stator 110. Throughout the present disclosure, the rotor shaft may be regarded as any element of the rotor that is rotatably supported by the stator.

FIG. 3 also shows that the electrical machine 100 may comprise a slip ring and a brush 136 as part of the grounding assembly 133. In the above case, the brush 136 may be electrically coupled with the slip ring and with a conducting element to ground. Additionally, the electrical machine 100 may also comprise a grounding connection between the stator 110 and the rotor shaft 130.

Besides, the electrical machine 100 may include different number of bearings 140, 141. For example, the electrical machine 100 may comprise two bearings, a first bearing 140 located in a non-drive end 132 of the rotor shaft 130 and a second bearing 141 located in a driven end 131 of the rotor shaft 130. The exemplary embodiment in FIG. 3 shows two ball bearings but other type of bearings, such as roller bearings, as well as other bearing arrangements could be used. In case of an electrical machine 100 with more than one bearing, the electrical shunt 160, 161 may be only electrically coupled with the rotor shaft 130 and with the bearing 141 located in a driven end 131 of the rotating body.

The inventors have found that the EDM bearing currents are considerably higher across the drive end bearing 141 than across the non-driven end bearing 140. More precisely, the inventors have found that the EDM bearing currents in the drive end bearing 141 may reach up to four times the current level across the non-driven end bearing 140.

Despite the above, in other examples both the first bearing 140 and the second bearing 141 may comprise an electrical shunt 160, 161 between the rotor shaft 130 and a point of the stator 110 at the bearing side of the corresponding bearing electrical insulation 150, 151. The plurality of electrical shunts 160, 161 may share some of the technical features described above, i.e. the electrical shunts may comprise a brush 162 and a conductive element 164, 165. Alternatively, not all the electrical shunts 160 may have the same components or mechanical and electric properties.

As it is also shown in FIG. 3, the load may be connected to the rotor shaft 130 through a shaft electrical insulation 134.

In other examples, the electrical machine 100 disclosed in relation with FIG. 3 may be included in an electric motor, such as for example a podded propulsion electric motor for underwater applications. In yet other examples, the electrical machine may be a doubly-fed induction generator.

Figure 4:
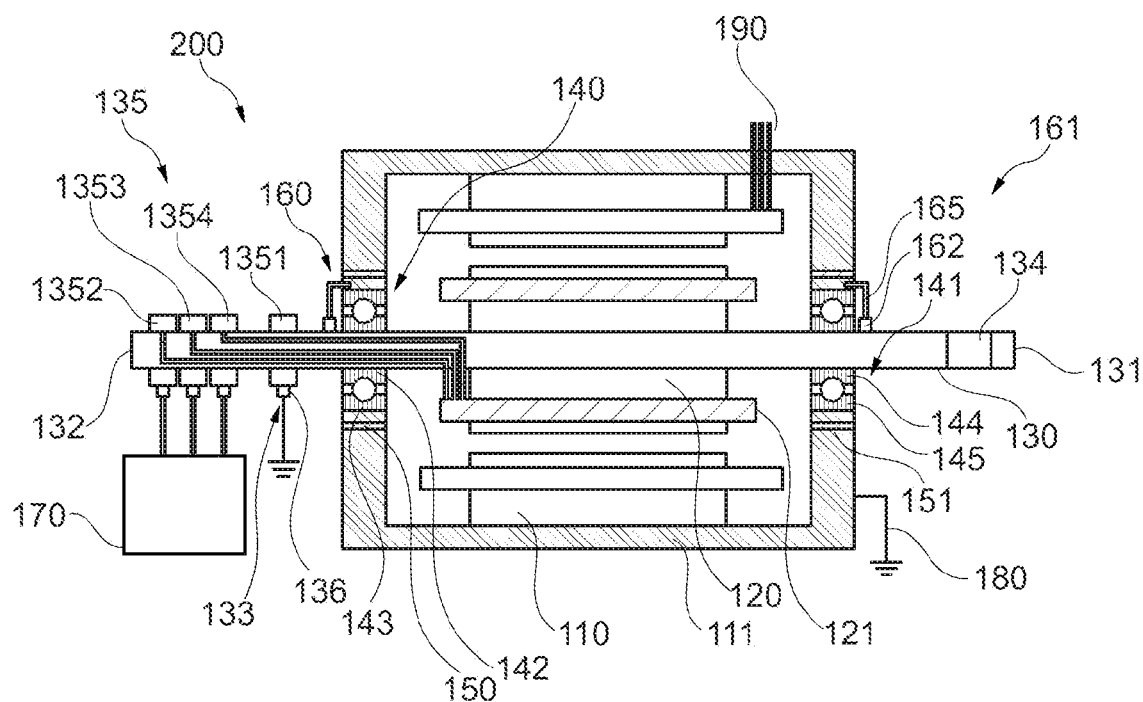
FIG. 4 schematically illustrates a cross-section view of a doubly-fed induction generator according to another example.

FIG. 4 illustrates a cross-section view of a doubly-fed induction generator 200 according to the present disclosure. The doubly-fed induction generator 200 comprises a generator stator 110, a generator rotor 120 having a rotor shaft 130 and a rotor winding 121 configured to be fed by a pulse width modulation converter 170 and a load at a driven end 131 of the rotor shaft 130. Further, the doubly-fed induction generator 200 comprises a first bearing 140 arranged at the non-driven end 132 and a second bearing 141 arranged at the driven end 131. The first and second bearings 140, 141 comprise an inner ring 142, 144 mounted to the rotor shaft 130 and an outer ring 143, 145 mounted to respectively a first or a second bearing supporting stator portion. Further, the bearings 140, 141 comprise rolling elements between the inner ring 142, 144 and the outer ring 143, 145. Besides, a first bearing electrical insulation 150 is arranged between the first bearing supporting stator portion and a remainder of a stator frame 111, and the second bearing electrical insulation 151 is arranged between the second bearing supporting stator portion and the remainder of the stator frame 111. Additionally, the doubly-fed induction generator 200 comprises a first electrical shunt 160 arranged between the rotor shaft 130 and the first bearing supporting stator portion and a second electrical shunt 161 arranged between the rotor shaft 130 and the second bearing supporting stator portion. The first and second electrical shunts 160, 161 have a low impedance at high frequency. As previously discussed, the impedance of the electrical shunts 160, 161 may be smaller than the impedance of the bearing lubricant, i.e. oil or grease. As mentioned before, in some examples, the electrostatic capacitance of the lubricant may be around $10^{-8}$ F, whereas the inductance of the shunts 160, 161 may be around $10^{-7}$ H.

Further, FIG. 4 shows that the rotor shaft 130 may comprises a slip ring 135 with a plurality of tracks 1351, 1352, 1353, 1354 configured to provide grounding and to feed the generator rotor 120 with current from a pulse width modulation converter 170. Additionally, the doubly-fed induction generator may comprise an electric connection 190 to a grid.

FIG. 4 illustrates that the rotor shaft 130 comprises a shaft electrical insulation 134 between the first bearing and the load.

As previously discussed, the first and second electrical shunts 160, 161 may include a shunt brush 162. The shunt brush 162 may be a silver graphite brush, a carbon fiber brush or other suitable brush.

The doubly-fed induction generator 200 provided may be included in a wind turbine 10. The wind turbine 10 may have any of the technical features disclosed in relation to FIGS. 2 and 3, or any other features known in the art.

Thus, the podded propulsion motor and the doubly-fed induction generator 200 should be merely understood as two examples of electrical machines where the present disclosure can be applied.

Note that some of the technical features described in relation with the wind turbine 10 can be included in the electrical machine 100, and vice versa. In fact, a wind turbine may comprise a doubly-fed induction generator 200 as disclosed above.

Figure 5:
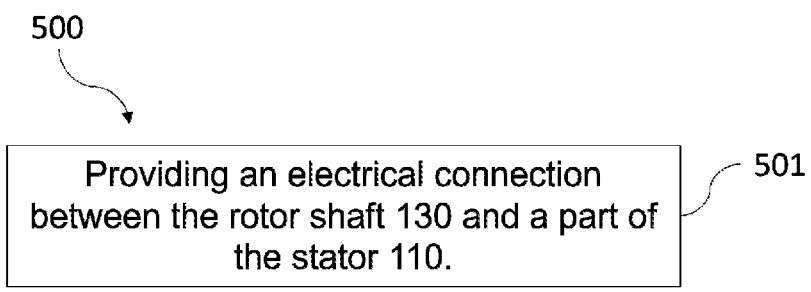
FIG. 5 is a flow diagram of a method to mitigate EDM bearing currents in electrical machines according to one example.

FIG. 5 is a flow diagram of an example of a method 500 for mitigating electrical discharge machining bearing currents in electrical machines 100 controlled by pulse width modulation from a power converter 170. The electrical machine 100 comprises a stator 110, a rotor 120 including a rotor shaft 130, a load operatively connected to the rotor 120 and wherein the rotor shaft 130 is rotatably mounted with respect to the stator 110 through one or more bearing 140, 141. In particular, FIG. 5 shows that the method 500 comprises, at block 501, providing an electrical connection between the rotor shaft 130 and a part of the stator 110 at a bearing side of the bearing of an electrical insulation 150, 151.

In examples, the electrical connection between the rotor 120 and the stator 110 may also comprise a shunt brush 162.

Further, the electrical connection 160, 161 between the rotor shaft 130 and the stator 110 has a low impedance at high frequency. As discussed, the impedance of the electrical connection 160, 161 may be an order of magnitude smaller than the impedance of the bearing lubricant (or even smaller).

In some examples, the electrical connection between the rotor and the stator includes coupling an electrical shunt 160, 161 to a bearing 141 located in a driven end 131 of the rotor shaft 130.

In some further examples, the electrical connection between the rotor 120 and the stator 110 comprises providing a first electrical shunt 160 in parallel with a first of the bearing 140 and a second shunt brush 161 in parallel with a second of the bearing 141.

Additional technical features described in relation with electrical machines and, more particularly, with doubly-fed induction generators and wind turbines, may also be included in the method 500 to mitigate EDM bearing currents.

This written description uses examples to disclose the present teaching, including the preferred embodiments, and also to enable any person skilled in the art to practice it, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. An electrical machine configured to be fed by pulse width modulation from a power converter, comprising:
   a stator;
   a rotor comprising a rotor shaft with a grounding assembly;
   a load operatively connected to the rotor;
   one or more bearings arranged between the rotor and the stator, the bearings comprising an inner ring, an outer ring, and rolling elements and lubricant between the inner ring and the outer ring;
   one of the inner ring or the outer ring mounted to the rotor shaft and the other of the inner ring or the outer ring mounted to a bearing supporting stator portion;
   a bearing electrical insulation arranged between the bearing supporting stator portion and a remainder of the stator; and
   an electrical shunt arranged between the rotor shaft and a point of the stator at a bearing side of the bearing electrical insulation, wherein the shunt has an impedance at a high frequency of at least 1 MHz that is lower than an impedance of the lubricant of the bearing.

2. The electrical machine of claim 1, wherein the shunt comprises a shunt brush.

3. The electrical machine of claim 1, wherein the shunt brush comprises a silver graphite brush or a carbon fiber brush.

4. The electrical machine of claim 1, wherein the grounding assembly comprises a slip ring and a grounding brush electrically coupled with the slip ring and with a conducting element to ground.

5. The electrical machine of claim 1, comprising a first one of the bearings arranged at a drive end of the electrical machine and a second one of the bearings arranged at a non-drive end of the electrical machine.

6. The electrical machine of claim 5, wherein each of the first bearing and the second bearing comprises a respective electrical shunt between the rotor shaft and a point of the stator at the bearing side of the corresponding bearing electrical insulation.

7. The electrical machine of claim 1, wherein the load is connected to the rotor shaft through a shaft electrical insulation.

8. The electrical machine of claim 1, further comprising a grounding connection for the stator.

9. The electrical machine of claim 1, wherein the electrical machine is a doubly-fed induction generator.

10. The electrical machine of claim 1, wherein the electrical machine is a motor.

11. The electrical machine of claim 10, wherein the motor is a podded propulsion motor.

12. A wind turbine, comprising the electrical machine of claim 1, wherein the electrical machine is a doubly-fed induction generator.

13. A method for mitigating electrical discharge of machining bearing currents in an electrical machine that is controlled by pulse width modulation from a power converter, the electrical machine including:
   a stator;
   a rotor having a rotor shaft rotatably mounted with respect to the stator through one or more bearings that include an inner ring, an outer ring, and rolling elements and lubricant between the inner ring and the outer ring, one of the inner ring or the outer ring mounted to the rotor shaft and the other of the inner ring or the outer ring mounted to a bearing supporting stator portion;
   a bearing electrical insulation arranged between the bearing supporting stator portion and a remainder of the stator;
   a load operatively connected to the rotor;
   the method comprising:
      providing an electrical connection between the rotor shaft and a part of the stator at a bearing side of the bearing electrical insulation; and
      wherein the electrical connection has a low impedance at a high frequency of at least 1d MHz that is lower than an impedance of a lubricant of the bearings.

14. The method of claim 13, wherein the electrical connection is a shunt brush.

15. The method of claim 14, further comprising providing a first shunt brush in parallel with a first one of the bearing and a second shunt brush in parallel with a second one of the bearings.

* * * * *